(12) United States Patent
Kugler (10) Patent No.: US 6,386,565 B1
(45) Date of Patent: May 14, 2002

(54) TRACTION SYSTEM

(75) Inventor: Michael W. Kugler, Hope Valley, RI (US)

(73) Assignee: Moroso Performance, Guilford, CT (US)

( * ) Notice: Subject to any disclaimer, the term of this patent is extended or adjusted under 35 U.S.C. 154(b) by 0 days.

(21) Appl. No.: 09/627,364

(22) Filed: Jul. 28, 2000

(51) Int. Cl.⁷ .............................................. B60G 11/32
(52) U.S. Cl. ...................... 280/124.165; 280/121.104; 280/124.17; 280/124.175
(58) Field of Search ................... 280/124.102, 124.104, 280/124.175, 124.165, 757, 124.17, FOR 175; 267/242, 271, 67

(56) References Cited

U.S. PATENT DOCUMENTS

| | | | |
|---|---|---|---|
| 1,970,859 A | * | 8/1934 | Lenze |
| 4,098,523 A | | 7/1978 | Valero ........................ 280/718 |
| 5,354,092 A | | 10/1994 | Calvert ........................ 280/718 |
| 5,632,504 A | * | 5/1997 | Gallagher |

FOREIGN PATENT DOCUMENTS

DE   1150701   * 10/1961 .................. 267/67

* cited by examiner

*Primary Examiner*—Eric Culbreth
(74) *Attorney, Agent, or Firm*—Cummings & Lockwood (57) ABSTRACT

A traction device is provided that includes a rigid front mount assembly that may be clamped to or around the vehicle's leaf spring, thereby creating a positive displacement point for torque transmitted from the rear axle through a telescoping linkage. An advantageous shock absorption element associated with the telescoping linkage cushions forces transmitted therethrough. Free travel and pre-load adjustments are made quick and easy through a readily accessible adjustment mechanism. A preferred bracket design is also provided which ensures optimal force transmission and enhanced system strength and reliability. The traction device of the present disclosure may be included in original vehicle fabrication and assembly, or may be readily installed on existing vehicles without the need for welding or modifications to the chassis or rear axle housing.

15 Claims, 5 Drawing Sheets

TRACTION SYSTEM

BACKGROUND

1. Technical Field

The present disclosure relates to a system for enhancing the traction performance of vehicles, e.g., automobiles, and more particularly, to a system that enhances the efficiency and effectiveness of traction performance, particularly during vehicle acceleration.

2. Background Art

Devices and/or systems for enhancing traction between the wheels of a motor vehicle and a road surface have been developed and marketed in the automotive field. For example, U.S. Pat. No. 4,098,523 to Valerio describes an effective system for improved traction for a rear wheel drive vehicle. Indeed, a device/system according to the Valerio '523 patent has been manufactured and marketed for several years by Competition Engineering, a division of Moroso Performance, the assignee of the present disclosure.

As described in the Valerio '523 patent, during pronounced vehicle acceleration, e.g., in drag racing, the forces on the rear spring and the rapid acceleration of the wheels result in decreased contact of the rear wheels with the road surface, thereby causing wheel hopping and/or inadequate traction due to less than optimum transfer of weight to the vehicle's rear wheels. The Valerio '523 system improved upon the standard traction bar that is typically secured to the rear axle housing and spring for each rear wheel by providing an innovative telescopic tubular assembly that could be advantageously deployed between the rear axle housing of the vehicle and the rear leaf spring.

More particularly, the Valerio '523 system provided a first member pivotally mounted to rear axle housing by a bracket assembly (inner member 3) and a second member pivotally mounted to the leaf spring by a second bracket assembly (outer member 6). An elastomeric member 10 is advantageously deployed between a pair of flanges (flanges 7 and 8) to absorb shock and transmit forces during operation of the Valerio '523 device. In the pictured Valerio embodiment, flange 8 extends from outer member 6, whereas flange 7 extends from a further outer member 5. Outer member 5 is advantageously fixed relative to inner member 3 by through bolt 12 that extends through aperture 33. Thus, inner member 3 and outer member 5 are adapted for conjoint movement. Inner member 3 extends within outer member 6 for a distance sufficient to ensure that members 3 and 6 remain in cooperative relation once mounted to a vehicle.

The elastomeric member 10 provided by the Valerio '532 patent is disclosed to have an endless band construction and be fabricated form a relatively hard material, e.g., rubber having a durometer of 65–70. As disclosed in the Valerio '532 patent, utilization of an elastomeric member having the disclosed "durometer, width and length [provides] sufficient movement of the outer member 6 and adequate cushioning whereby the forces exerted on the connection between the first outer member 5 and inner member 3 as well as of the connections between the inner member 3 and the outer member 6 and their respective mountings to the vehicle during acceleration to provide sufficient compression to the elastomeric member 10 and proper distribution of the area of shock, combined with relative movement of the outer member 6 on the inner member 3, to minimize damage to the device when in operation." The entire contents of U.S. Pat. No. 4,098,523 to Valerio are incorporated herein by reference.

A further product directed to improved traction for motor vehicles is described in U.S. Pat. No. 5,354,092 to Calvert and is commercially available from Calvert Racing (Lancaster, Calif.). The "Cal-Tracs System" includes a rear support assembly bolted adjacent to a leaf spring opposite to a rear axle, a front support assembly pivotally attached to a front end of the leaf spring, and a rigid link which extends between and is attached to both the front and rear support assemblies at locations spaced from the leaf spring. The front support assembly includes a pair of generally triangular plates wherein a bolt is provided at each apex to connect the plates. A first upper bolt extends through a front spring eye of the leaf spring to provide a pivot axis for the front support assembly. A second upper bolt is positioned to extend across an upper surface of the leaf spring at a location spaced rearwardly from the front spring eye, to limit pivotal movement of the front support assembly relative to the leaf spring. A third bolt extends between the plates at a lower end thereof to secure a front end of the rigid link. This rigid link includes an elongated link tube or bar having eye connectors threaded into the front and rear ends thereof. The eye connectors have opposite threads relative to one another such that rotation of the elongated bar about its longitudinal axis changes the overall length of the rigid link.

Despite the efforts to date in improving traction performance of vehicles, particularly the positive attributes associated with the Valerio '523 traction design and the commercial product based thereon, several opportunities for improved performance and use are apparent. In particular, improved ease of adjustment of the transaction device, e.g., to address specific road and/or track conditions is desirable. In addition, improved shock absorption and translation of forces by the traction device are desired. In improving the system performance, e.g., in translating forces for improved traction, it is essential that the overall system operate without failure or fatigue. These and other objectives are met by the traction device of the present disclosure.

SUMMARY OF THE DISCLOSURE

The system of the present disclosure is designed for use in automotive applications desiring superior traction performance. The system finds particular utility within rear wheel drive vehicles adapted for racing, e.g., Stock Eliminator and Bracket Racing vehicles. However, the presently disclosed system may be advantageously employed in non-racing vehicles to gain the superior performance characteristics enabled thereby.

In a first preferred embodiment of the traction system of the present disclosure, a system for enhancing vehicle traction is provided that includes a first tube assembly defining a first stop flange and a second tube assembly defining a second stop flange. The second tube assembly is advantageously disposed in part within the first tube assembly. In addition, the first tube assembly and the second tube assembly are mounted with respect to a vehicle such that the first tube assembly and the second tube assembly are slidably movable with respect to each other.

A shock pad is also provided that is movably positioned on at least one of the tube assemblies. The shock pad is positioned between the first stop flange and the second stop flange, and is optimally fabricated at least in part from a urethane material. In a particularly preferred embodiment, the shock pad is fabricated from a urethane material having a Shore durometer of about 95A. Alternative shock pads are also contemplated, e.g., wherein the shock pad includes a metal tube positioned between said urethane material and tube assembly. In the case of a metal tube within the shock pad, it is contemplated that the urethane material would define a first length of the shock pad and the metal tube would define a length shorter than the urethane's length. In further contemplated embodiments, the shock pad would be fabricated from a plurality of materials, each material having a differing Shore durometer, and/or the shock pad would have a geometry selected from geometries such as a cylinder, cone and hour glass-shape.

In a further embodiment of the present disclosure, a system for enhancing vehicle traction of a vehicle is provided which includes first tube assembly defining a first stop flange and a second tube assembly defining a second stop flange. The second tube assembly is disposed in part within the first tube assembly and the two tube assemblies are mounted with respect to the vehicle such that they are slidably movable with respect to each other. A shock pad is movably positioned on at least one of the first tube assembly and the second tube assembly and between the first and second stop flanges.

An adjustment mechanism is advantageously provided for adjusting the relative positioning of the shock pad between the first and second stop flanges. The adjustment mechanism includes an adjustment screw that is threaded into one of the tube assemblies. The adjustment mechanism further advantageously includes a jam nut for use in adjusting the threading of the adjustment screw. The adjustment screw is typically positioned between a rod end and one of the tube assemblies, the rod end generally being pivotally mounted to a bracket that is, in turn, mounted to a vehicle. A further nut is typically mounted, e.g., welded, on one of the tube assemblies, e.g., adjacent a stop flange, to facilitate tightening thereof, e.g., with a wrench.

According to this preferred embodiment of the present disclosure, adjustment of the adjustment mechanism causes the gap between the first and second stop flanges to be varied. For example, the gap may be adjusted such that the shock pad is brought into contact with both the first and second stop flanges, or adjusted such that the shock pad is spaced between the first and second stop flanges by a predetermined distance, e.g., about one half inch.

In a further preferred system for enhancing vehicle traction of a vehicle according to the present disclosure, first and second tube assemblies are provided, each of which defines a stop flange. The second tube assembly is disposed in part within the first tube assembly, and the two tube assemblies are mounted with respect to a vehicle such that the tube assemblies are slidably movable with respect to each other. A shock pad is provided that is movably positioned on at least one of the tube assemblies and between the stop flanges.

According to this further preferred embodiment, a first bracket is provided that includes: (i) a first plate, (ii) a pair of faces extending downwardly from the first plate and (iii) a pair of triangular side walls extending upwardly from the first plate. One of the tube assemblies is pivotally mounted between the downwardly extending faces and a bushing is positioned between the upwardly extending side walls for mounting the bracket to a vehicle. According to a preferred embodiment of the bracket disclosed herein, the upwardly extending triangular side walls define a height and the first face defines a length. The ratio of the height to length (as defined herein) is advantageously between about 0.85:1 and 1:0.85, and preferably about 1:1.

Further features, uses and advantages associated with the traction system disclosed and claimed herein will become apparent from the figures and detailed description of preferred embodiments which follow. However, the present disclosure is not to be limited by the preferred embodiments disclosed herein, but such preferred embodiments are intended to be merely exemplary systems according to the invention disclosed and claimed herein.

BRIEF DESCRIPTION OF THE DRAWINGS

Preferred embodiments of the present disclosure are described hereinbelow with reference to the drawings, wherein.

FIGS. 3–8 and their features are "schematic" showings of parts, and these drawings are for illustrative purposes only and do not imply any specific structure.

DETAILED DESCRIPTION OF PREFERRED EMBODIMENTS(s)

The traction device of the present disclosure finds widespread application in the automotive field, and particularly in the automotive racing field, e.g., for Stock Eliminator and Bracket Racing vehicles. A rigid front mount assembly is clamped to or around the vehicle's leaf spring, thereby creating a positive displacement point for torque transmitted from the rear axle through a telescoping linkage. An advantageous shock absorption element associated with the telescoping linkage cushions forces transmitted therethrough. Free travel and pre-load adjustments are made quick and easy through a readily accessible adjustment mechanism. The traction device of the present disclosure may be included in original vehicle fabrication and assembly, or may be readily installed on existing vehicles without the need for welding or modifications to the chassis or rear axle housing.

Figure 1:
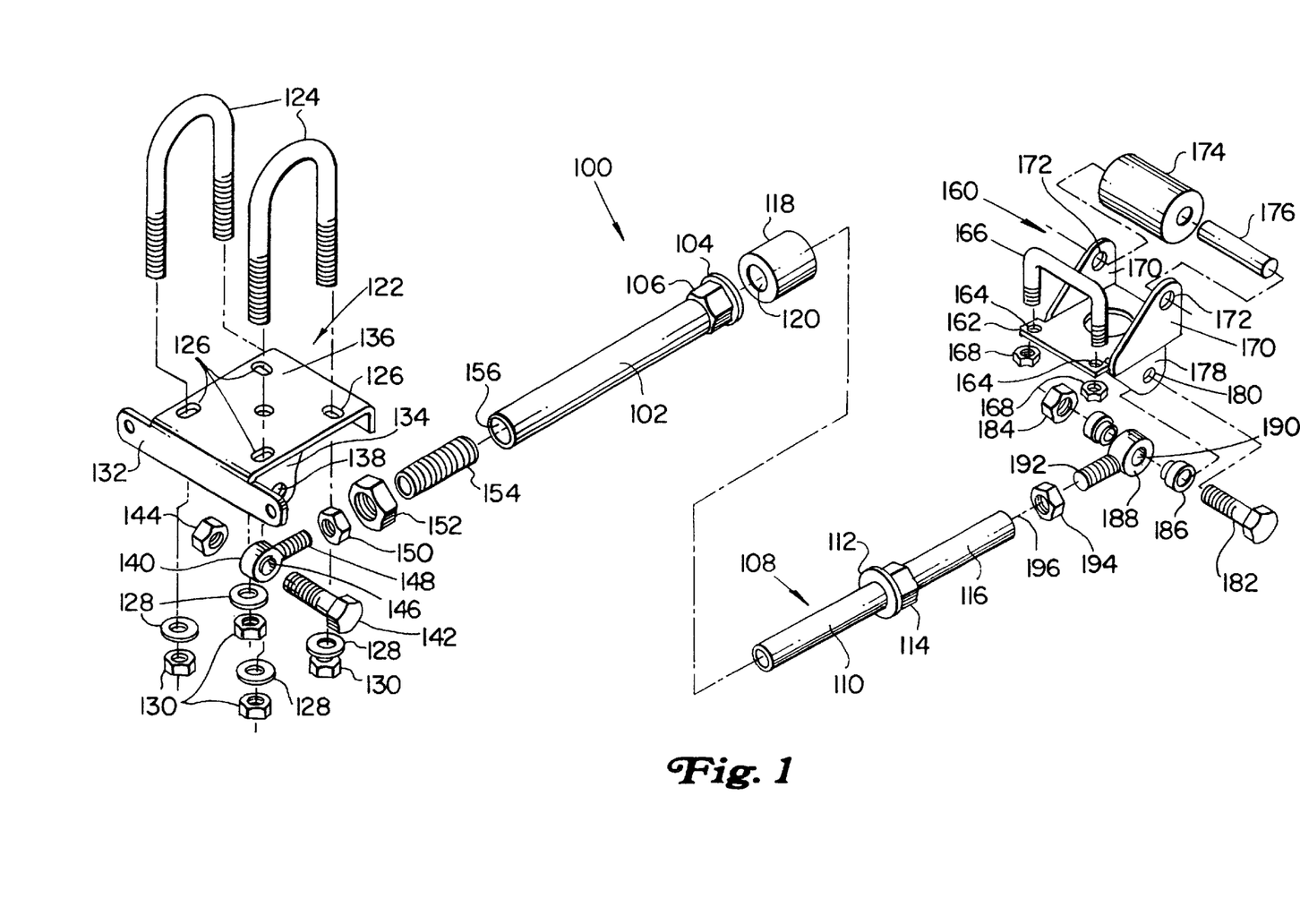
FIG. 1 is an exploded perspective view of a traction device according to the present disclosure.

With reference to FIG. 1, a traction device 100 according to the present disclosure is depicted in an exploded manner. Traction device 100 includes rear tube assembly 102 that defines a first flange stop 104 at one end thereof, and a hexagonal nut 106 adjacent thereto. A slide tube assembly 108 is provided that includes an elongated section 110 that is dimensioned to slide within rear tube assembly 102. As with the traction device of the Valerio '523 device described hereinabove and incorporated herein by reference, elongated section 110 has a length sufficient to ensure that, once assembled and installed, rear tube assembly 102 and slide tube assembly 108 remain in telescoping cooperation. Slide tube assembly 108 further includes a flange stop 112, a hexagonal nut 114 adjacent to flange stop 112, and a forward extension 116. The lengths and relative dimensions of rear tube assembly 102 and slide tube assembly 108 are selected so as to allow traction device 100 to cooperate with standard chassis/suspension systems, as will be apparent to persons skilled in the art.

A shock pad 118 having a central aperture 120 is provided intermediate flange stops 104, 112 and around elongated section 110 of slide tube assembly 108. When traction device 100 is assembled and installed on a vehicle, the interaction between shock pad 118 and stop flanges 104, 112 is central to the operation of traction device 100, as will be described in greater detail hereinbelow.

A spring pad bracket 122 is provided at one end of traction device 100. Spring pad bracket 122 includes a horizontal plate 136 through which are defined a plurality of apertures 126 for use in mounting traction device 100 to rear axle housing 201 (See FIG. 3) with U-bolts 124 and associated washers 128 and locknuts 130. Spring pad bracket 122 further includes a downwardly extending flange 132 and a pair of transverse plates 134. Transverse plates 134 gain structural rigidity through their cooperation with horizontal plate 136 and downwardly extending flange 132. An aperture 138 is formed in each of the transverse plates 134 for use in pivotally mounting rod end 140 therebetween. A bolt 142 and locknut 144 are passed through eye 146 formed in rod end 140 to secure rod end 140 to spring pad bracket 122 and to thereby pivotally mount traction device 100 to the rear axle housing 201 (See FIG. 3).

The cooperation of the threaded portion 148 that extends from rod end 140, jam nut 150, larger diameter jam nut 152, adjustment screw 154, and rear tube assembly 102 provide highly advantageous adjustability to traction device 100 of the present disclosure. Load adjustments according to prior traction devices have been less easily accomplished and have limited a user's ability to make timely changes to the load characteristics of the traction system, e.g., in response to track conditions and the like. According to the load adjustment functionality of the present disclosure, the adjustment screw 154 is advantageously threaded into the open end 156 of rear tube assembly 102. Typically, the adjustment screw 154 is initially threaded approximately two inches into rear tube assembly 102, although such dimensional specifics are clearly a matter of design choice and the overall geometry of the traction device 100. Thereafter, jam nut 152 is thread onto adjustment screw 154, while jam nut 150 is installed onto the threaded portion 148 of rod end 140. In each such case, appropriate lubrication is employed, e.g., anti-seize paste. The threaded portion 148 is threaded into the adjustment screw 154 an appropriate distance, e.g., about one inch.

Once traction device 100 is fully assembled, the spatial relationship between shock pad 118 and stop flanges 104, 112 is dependent upon the manner in which the distance between front spring eye bracket 160 and spring pad bracket 122 is bridged. This special relationship constitutes a controllable parameter for defining the shock absorption and force transmission attributes of traction device 100. Insofar as it is desired to reduce the gap between shock pad 118 and stop flanges 104, 112, thereby reducing the "delay" in force transmission according to the traction device of the present disclosure, rotating rear tube assembly 102 relative to adjustment screw 154 so as to reduce the amount of adjustment screw 154 positioned within rear tube assembly 102 acts to move stop flange 104 toward stop flange 112. This adjustment in turn reduces the gap between shock pad 118 and the respective stop flanges 104, 112, thereby translating to a more direct, less delayed translation of force through traction device 100. Conversely, if it is desired to provide greater "lost motion" between rear tube assembly 102 and slide tube assembly 108, rotation of rear tube assembly 102 relative to adjustment screw 154 such that stop flange 104 is moved away from stop flange 112 is undertaken. A greater gap may be desirable, for example, when a vehicle is to be used on a track with superior traction, thereby avoiding the potential for lost horse power in delivering unnecessarily enhanced traction via traction device 100 to the wheels. Typically, a gap of about ½" is provided between shock pad 118 and stop flanges 104, 112, although different distances may be desirable depending on road/track conditions, user preferences, shock pad 118 characteristics, etc.

The adjustment functionality provided by the traction device of the present disclosure is particularly advantageous for several reasons. First, control of the adjustment setting is readily accessible once the traction device is installed on a vehicle. Second, the adjustment mechanism permits extremely fine adjustments to the gap between the stop flanges 104, 122, thereby increasing a user's control over the performance of the traction device. Third, the adjustment mechanism disclosed herein does not affect the structural integrity of the traction device. Fourth, it is not necessary to disassemble the traction device or any aspect of the vehicle's suspension/chassis system to utilize the adjustment mechanism. Based on the ease of use and access of the adjustment mechanism of the present disclosure, the traction device of the present disclosure may be used to maximum advantage by vehicle owners across a broad range of driving conditions.

Turning to shock pad 118, it has been found according to the present disclosure that significantly enhanced performance may be achieved through utilization of shock pad(s) having advantageous physical properties. According to the present disclosure, when sufficient force is exerted on traction device 100, e.g., during acceleration, stop flanges 104, 112 move toward each other. At a certain point in this relative motion between stop flanges 104, 112, shock pad 118 is compressed therebetween. Ideally, shock pad 118 dampens the shock otherwise associated with instantaneous engagement between stop flanges 104, 112. This dampening is advantageously accomplished through compression of shock pad 118. Moreover, optimal compression of shock pad 118 allows engagement to be maintained when vehicle acceleration temporarily ceases, e.g., during gear shifts, thereby avoiding repeated jolts to the system. However, a shock pad that is too soft, i.e., absorbs too much energy through compression, defeats the purpose of traction device 100 by failing to deliver traction force in a timely fashion to the vehicle's wheels.

Figure 4:
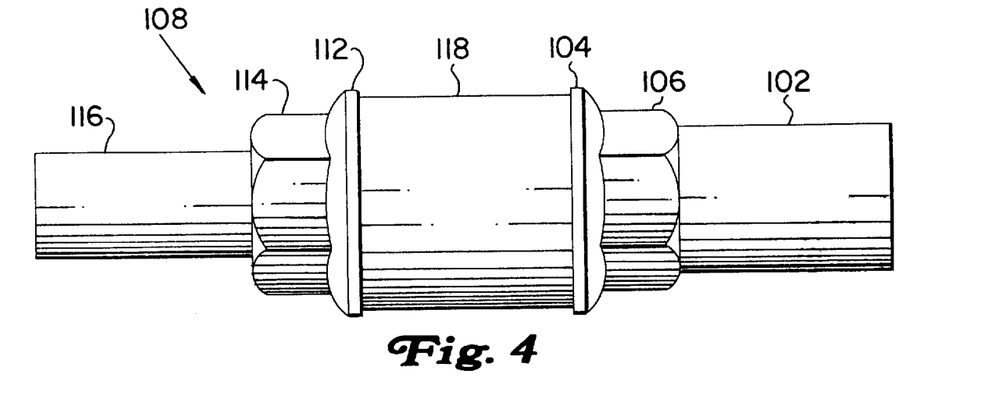
FIG. 4 is a partial elevation view of a cylindrical urethane shock pad disposed between first and second stop flanges.
Figure 5:
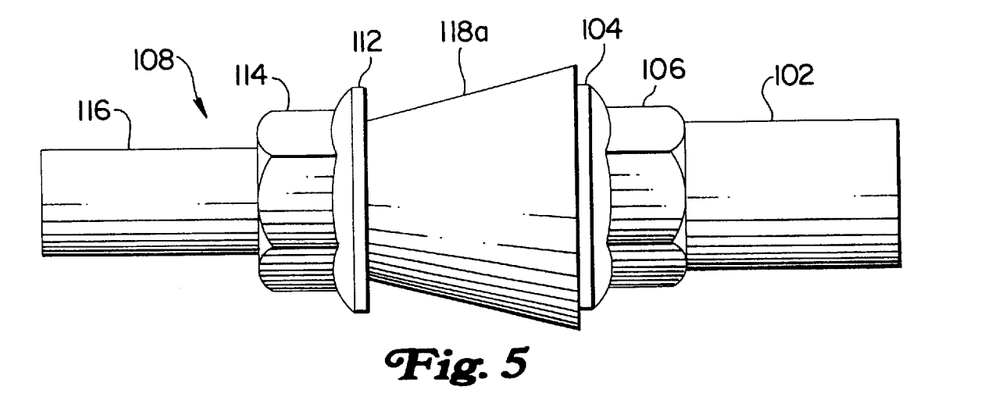
FIG. 5 is a partial elevation view of a conically-shaped urethane shock pad disposed between first and second stop flanges.
Figure 6:
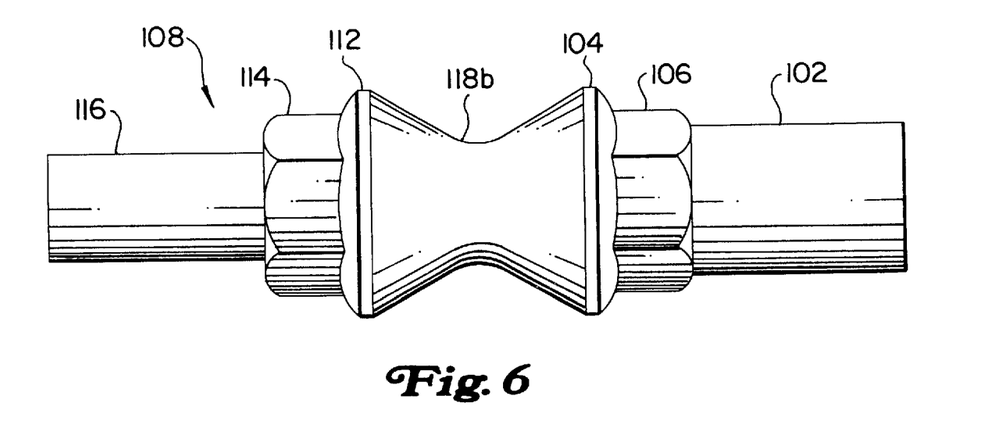
FIG. 6 is a partial elevation view of a hourglass-shaped urethane shock pad, disposed between first and second stop flanges.
Figure 7:
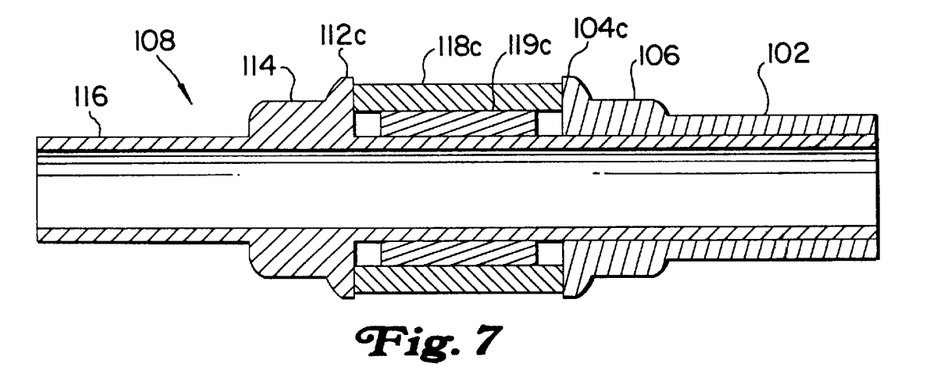
FIG. 7 is a partial cross-sectional view of a further embodiment of the shock pad which includes a thin metallic sleeve portion disposed within the urethane portion, the thin metal sleeve portion having a length less than that of the urethane portion.
Figure 8:
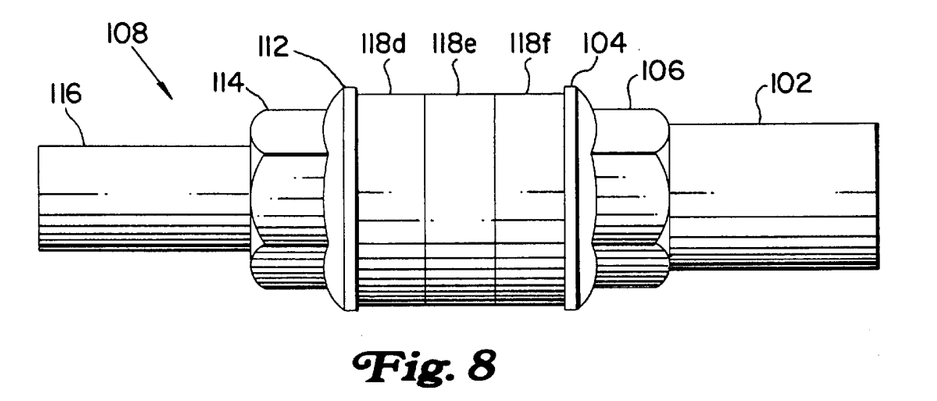
FIG. 8 is a partial elevation view of a urethane shock pad formed from a plurality of materials, each material having a different Shore durometer.

Referring now to FIG. 4, it has been found that use of a shock pad 118 fabricated from a urethane material is particularly advantageous in absorbing shocks to the traction device system, while concomitantly achieving optimal force translation. A particularly preferred urethane material for use in fabricating shock pad 118 has a Shore durometer of 95A. Alternative advantageous approaches to optimizing the performance of shock pad 118 have also been identified based on preferred geometries and materials of construction. For example, conically shaped shock pad 118a (See FIG. 5) or hour glass shaped shock pad 118b (See FIG. 6) are believed to provide advantageous performance characteristics, by requiring varying compressive forces at different points of compression. Thus, in the case of conically shaped shock pad 118a of uniform material construction, the smaller diameter and/or thinner walled portion of the cone provides less resistance to compression, thereby reaching a point of force translation through traction device more rapidly. With reference to FIG. 7, in an alternative design, a compressible shock pad 118c of a first length contains a thin, metal sleeve 119c of shorter length therewithin. Thus, when the compressible shock pad 118c is compressed to the point where the metal sleeve 119c contacts the stop flanges 104c and 112c at both ends, direct force translation is achieved, independent of the presence of the compressible shock pad 118c. As a further exemplary modification to shock pad contemplated according to the present disclosure, a shock pad as shown in FIG. 8 which is formed from a plurality of pads 118d–118f in side by side relation, each of the plurality of pads 118d–118f having differing durometers. The plurality of pads 118d–118f may be utilized to deliver variable force compression/translation properties during use of a traction device according to the present disclosure. These preferred illustrative embodiments wherein geometry and/or variable materials of construction are utilized to provide optimal force dampening/translation are merely exemplary. Additional variations will be apparent to persons skilled in the art based on the teachings contained herein, and such variations are deemed to be within the spirit and scope of the present disclosure.

Figure 2:
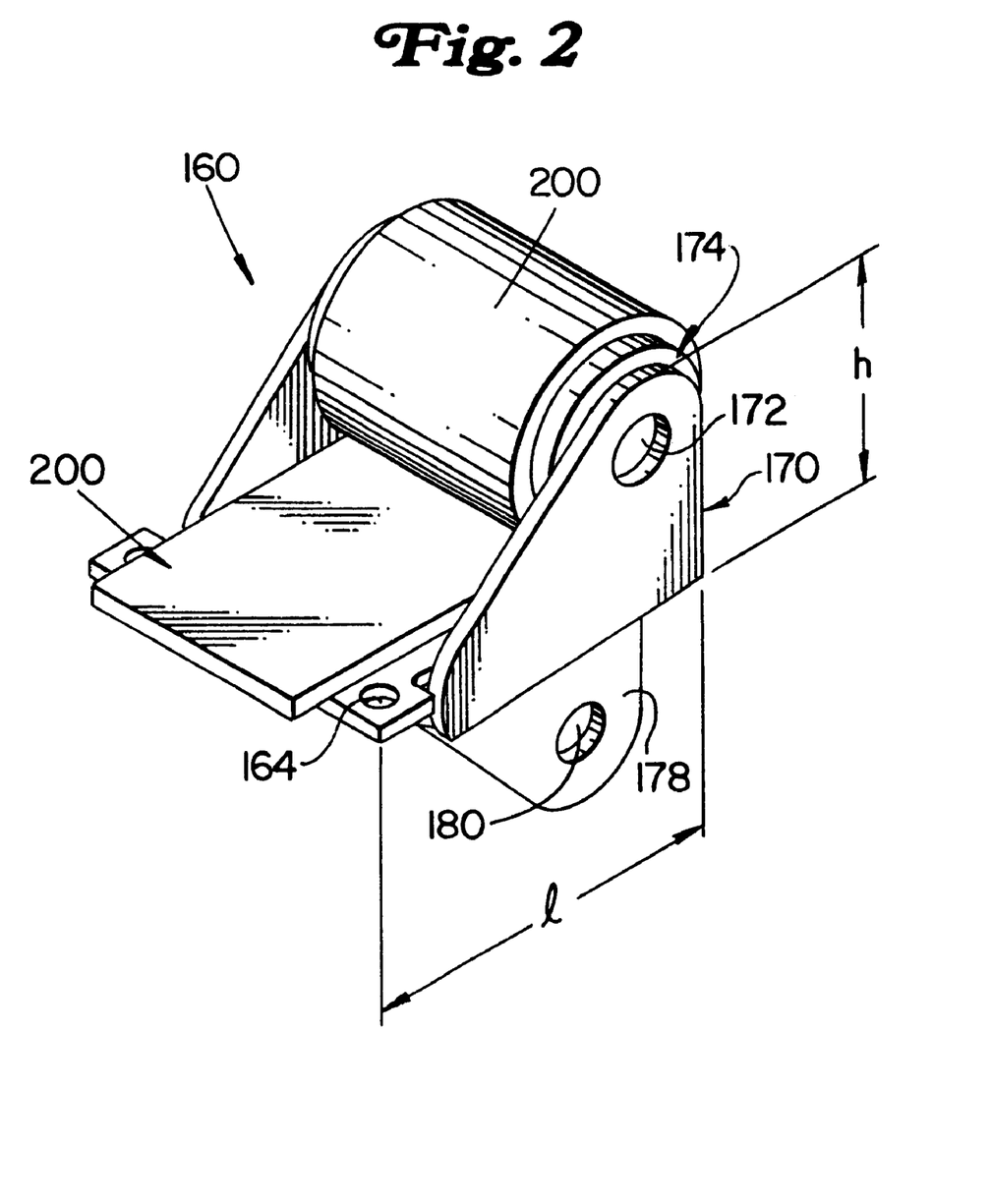
FIG. 2 is a perspective partial view of the structural interaction between a traction device according to the present disclosure and a vehicle's leaf spring.
Figure 3:
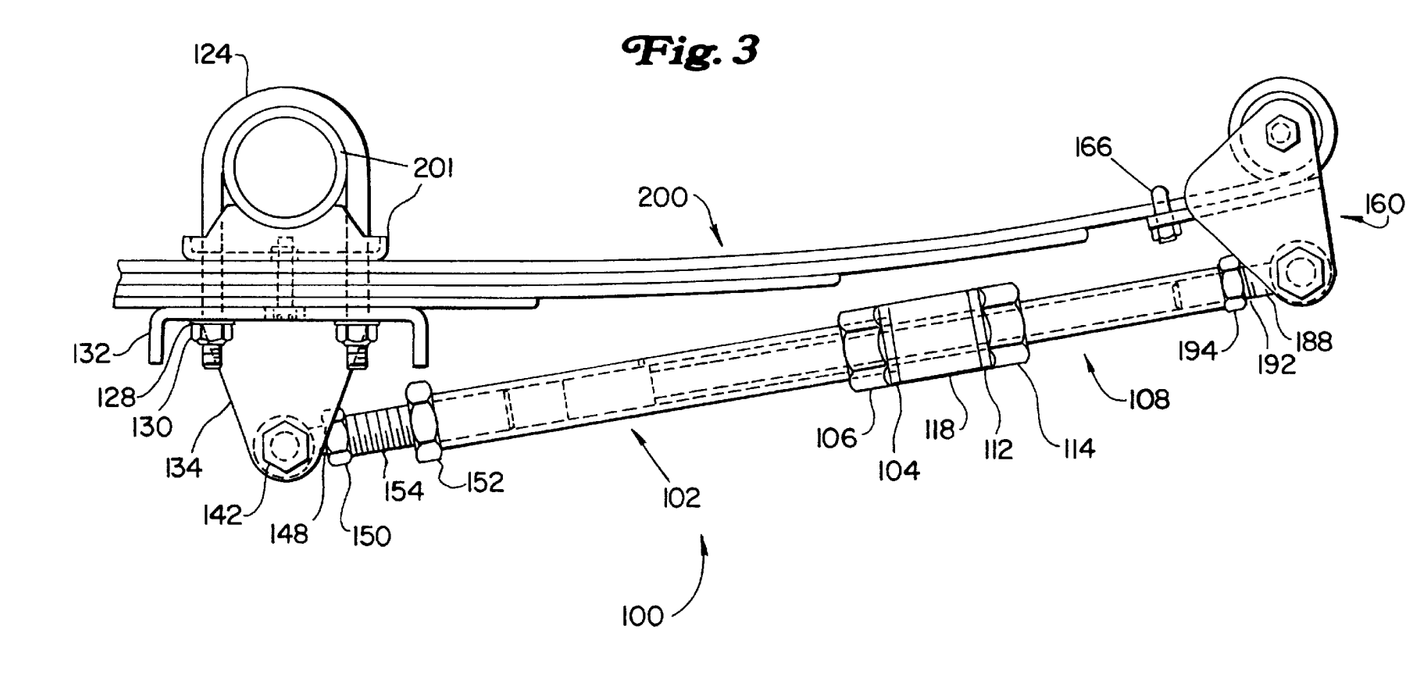
FIG. 3 is an elevation view of a traction device according to the present invention which is mounted between the rear axle housing and the rear leaf spring.

With reference to FIGS. 1 through 3, a front spring eye bracket 160 is depicted therein in which a first plate 162 having a pair of apertures 164 is provided. Apertures 164 permit front spring eye bracket 160 to be mounted to a leaf spring 200 by U-bolt 166 and nuts 168. A pair of upstanding triangular side walls 170 extend from first plate 162, each triangular side wall 170 having an aperture 172 for receipt of bushing sleeve 176. Bushing sleeve 176 is provided to mount spring eye bushing 174 thereto. Spring eye bushing 174 is preferably fabricated from aluminum. Spring eye bracket 160 also includes a pair of downwardly extending triangular faces 178, each such face 178 including an aperture 180 for use in mounting solid ring end 188 thereto. One or more gussets may be provided, e.g., mounted to the lower side of plate 162, to increase the rigidity and stability of spring eye bracket 160.

Of particular note, the forces experienced by traction device 100 are significant and each structural component of traction device 100 must be able to withstand such forces without failure or fatigue. It has been found that spring eye bracket 160 experiences substantial forces in connection with traction device 100 and that an optimal design thereof is of importance to the overall performance and reliability of a traction device according to the present disclosure. In particular, it has been found that an optimal relationship exists between the height of upstanding triangular walls 170 (designated as "h" in FIG. 2) and the length of first plate 162 (designated as "1" in FIG. 2). This height to length relationship has been found to be advantageously on the order of 1:1. While a certain degree of variation from a precise 1:1 relationship is contemplated, it is believed to be important to ensuring optimal force translation to and from the leaf spring, as well as enhanced structural integrity and reliability, that the relationship not vary to a large degree from such preferred ratio. Thus, it is believed that a ratio of height to length of from about 0.85:1 to about 1:0.85 define an appropriate range for optimal performance of the subject system.

For purposes of further describing the operation, installation and use of a traction device according to the present disclosure, exemplary instructions for installation and adjustment are provided hereinbelow. However, the present disclosure is not intended to be limited to use and/or adjustment according to such exemplary instructions, but rather to be merely illustrated thereby.

Installation of Traction Device

As noted previously, traction device 100 may be may be included in original vehicle fabrication and assembly, or may be readily installed on existing vehicles without the need for welding or modifications to the chassis or rear axle housing. When installing traction device 100 on an existing vehicle, the following installation steps may be followed with reference to traction device 100 depicted in FIG. 1:

1. Raise the vehicle and support it on the frame with jack stands. Lower the vehicle's rear housing so that the leaf springs are not supporting the chassis. Support the housing in place with jack stands and remove the rear tires.
2. With the weight of the housing supported, remove the leaf springs from the vehicle.
3. Unbolt the front spring hangers and press out the stock bushings, e.g., using a hydraulic press. Press in spring eye bushing 174, ensuring that an equal amount of bushing shows on each side of the spring eye.
4. Lubricate spring eye bushing sleeve 176 with an appropriate anti-seize paste and slide bushing sleeve 176 into spring eye bushing 174.
5. Reinstall the vehicle's front spring hangers over the spring eye. Slide front spring eye bracket 160 between the front hanger and spring eye bushing 174. As shown in FIG. 2, the clamp end of bracket 160 should face away from the spring eye.
6. Install spring clamp U-bolt 166 onto the front spring assembly using $\frac{7}{16}$"-14 Nylock nuts and tighten to 25 ft-lbs.
7. Mount the springs back onto the vehicle. The factory nut clips in the vehicle frame may be advantageously replaced, as will be understood by persons skilled in the art.
8. Position the rear axle housing in place and install spring pad bracket 122 using U-bolts 124, washers 128 and ½" locknuts 130, torquing U-bolts 124 to 70 ft-lbs.
9. Install the vehicle's shock absorbers to spring pad bracket 122.
10. Assemble the remaining components of traction device 100 according to the following steps:
    (a) Install solid rod end 192 with jam nut 194 into open end 196 of slide tube assembly 108. Lubricate the threads with appropriate anti-seize paste. Ensure that rod end 192 is threaded into slide tube assembly 108 an appropriate distance, e.g., one inch. Tighten jam nut 194 securely.
    (b) Assemble adjustment screw 154 into the open end 156 of rear tube assembly 102 so that it is threaded an appropriate distance therewithin, e.g., about two inches. Apply an appropriate anti-seize paste to the threads.
    (c) Thread a 1⅛" jam nut 152 onto the adjustment screw and tighten.
    (d) Install the ¾" jam nut onto threaded portion 148 and thread it into the end of adjustment screw 154. Use anti-seize paste on the threads. Ensure that threaded portion 148 threads into adjustment screw 154 an appropriate minimum distance, e.g., one inch.
    (e) Hold rear tube assembly 102 at hexagonal nut 106 with a wrench and tighten the ¾" jam nut 150. At this point, it is advisable to loosen 1⅛" jam nut 152 for later adjustment.

(f) Lubricate sliding tube assembly 108 with wheel bearing grease and slip shock pad 118 onto elongated section 110 of slide tube assembly 108.

(g) Introduce elongated section 110 of slide tube assembly 108 into the opening of rear tube assembly 102 adjacent stop flange 104.

11. Position the eye 190 of rod end 188 such that bolt 182, bushings 186 and locknut 184 may be used to pivotally mount the above subassembly to spring eye bracket 160. Bushings 186 are lubricated with anti-seize paste. Bolt 182 and locknut 184 are preferably hand tightened at this juncture.

12. While holding rod end 140 in one hand, rotate rear tube assembly 102 until rod end 140 lines up with the apertures 138 in spring pad bracket 122. Slip ¾"×2½" bolt 142 through apertures 138 and eye 146 in rod end 140. Install locknut 144 and tighten to 75 ft-lbs.

13. Rotate rear tube assembly 102 relative to adjustment screw 154 so that there is a ½" gap between shock pad 118 and flange stops 104, 112. The ½" gap is intended to be the total available gap between the flange stops 104, 112. Thus, shock pad may be flush against flange stop 104 with a ½" gap to flange stop 112, or flush against flange stop 112 with a ½" gap to flange stop 104, or some intermediate point wherein the total available gap is ½".

14. Tighten bolt 158 and locknut 184 so that the locknut just touches the downwardly extending flange 178 of front spring eye bracket 160. Then apply an additional ½ turn to locknut 184. It is important that bolt 158 not be overtightened because suspension binding may result.

15. Check that all bolts are tightened correctly. Ensure that jam nut 150 is loose and that a ½" gap remains between shock pad 118 and flange stops 104, 112 before lowering the vehicle to the ground.

16. Lower the vehicle to the ground.

17. Recheck the gap between shock pad 118 and flange stops 104, 112. If adjustment is required, rotate rear tube assembly 102 relative to adjustment screw 154. If rotation is not possible by hand, it may be necessary to raise one side of the vehicle at a time by the frame to facilitate rear tube assembly 102 rotation. The raising process should be repeated until an appropriate gap appears with the vehicle resting on all four wheels.

Adjustments to Traction Device

The traction device of the present disclosure is particularly advantageous in that adjustments are readily made in response to particular vehicle and/or driving conditions and parameters. Adjustments are best undertaken with the vehicle in condition for use, e.g., "race ready." Thus, it is advisable to have the tank fully fueled, the tire pressure correct, and the driver on board (unless otherwise noted herein).

1. Adjustments with corner scales:

Add one turn of pre-load to both sides of the suspension without the driver on board.

If scales capable of measuring the four corners of a vehicle are accessible, e.g., at a circle track chassis shop, the pre-load may be more accurately set. With the driver seated in the vehicle, add or remove pre-load on one side so that the weights of the rear tires are equal. Pre-load should not exceed four turns.

It is of note that a large variation in pre-load from side-to-side may cause the vehicle to launch erratically.

2. Adjustments without corner scales:

With the vehicle on level ground, roll the vehicle back and forth in a straight line at least five feet. This step is particularly important for vehicles equipped with a spool, but is necessary for all types of limited slip differential vehicles.

Block the front and back of at least one tire to prevent movement.

Rotate the driver's side rear tube until the tube stops making contact with shock pad 118. Rotate the tube one additional turn to apply pre-load to the system.

Tighten the 1⅛" jam nut 150 while holding hexagonal nut 106 with a wrench.

On the passenger side, rotate rear tube assembly 102 until contact is made between the shock tube 118 and stop flanges 104, 112, and rotation of rear tube assembly 102 stops. Rotate the rear tube assembly 102 an additional 1½ turns. The extra ½ turn helps to compensate for the driver's weight.

Tighten jam nut 150 while holding the welded nut on the rear tube assembly 102 with a wrench.

Make one pass on the system to re-check all hardware, and repeat the pre-load adjustment procedure, if necessary.

As with any automotive component, especially those used in the racing field, continual inspection of traction device 100 is recommended. Relubricate the sliding parts on a periodic basis, e.g., in connection with each race, to ensure proper operation.

Adjustments for Street Use

With the vehicle on level ground, roll the vehicle back and forth in a straight line at least five feet. This step is particularly important for vehicles equipped with all types of limited slip differentials.

Block the front and back of at least one of the front tires to prevent movement.

Rotate the rear tube assemblies 102 until contact is made between the shock pads 118 and the flange stops 104, 122.

Rotate the rear tube assemblies 102 in the opposite direction until a ¼" gap is present between each of the shock pads 118 and the flange stops 104, 122.

Tighten the jam nut 152 while holding the hexagonal nut 106 on the rear tube assembly 102 with a wrench.

For best performance at the race track, follow the race adjustment procedures. For best results in conventional driving, return to the street settings before returning the vehicle to conventional use.

While the present disclosure includes a description of a traction system and its use with reference to various specific embodiments, those skilled in the art will readily appreciate that various modifications, changes and enhancements may be made thereto without departing from the spirit or scope of the invention as defined by the appended claims.

What is claimed is:

1. A system for enhancing traction of a vehicle, comprising:

(a) a first tube assembly defining a first stop flange;

(b) a second tube assembly defining a second stop flange, said second tube assembly being disposed in part within said first tube assembly;

(c) said first tube assembly and said second tube assembly being mounted with respect to a vehicle such that said first tube assembly and said second tube assembly are slidably movable with respect to each other;

(d) a shock pad movably positioned on at least one of said first tube assembly and said second tube assembly and between said first stop flange and said second stop flange, said shock pad being fabricated at least in part from a urethane material; and (e) a nut mounted on one of said first or second tube assemblies adjacent said first or second stop flanges.

2. The system of claim 1, wherein said urethane material has a Shore durometer of about 95A.

3. The system of claim 1, wherein said shock pad further comprises a metal tube positioned between said urethane material and said at least one of said first tube assembly and said second tube assembly.

4. The system of claim 3, wherein said urethane material defines a first length of said shock pad and said metal tube has a length shorter than said first length.

5. The system of claim 1, wherein said shock pad is fabricated from a plurality of materials, each of said plurality of materials having a differing Shore durometer.

6. The system of claim 1, wherein said shock pad has a geometry selected from the group consisting of cylindrical, conical and hour glass-shaped.

7. A system for enhancing traction of a vehicle, comprising:

(a) a first tube assembly defining a first stop flange;

(b) a second tube assembly defining a second stop flange, said second tube assembly being disposed in part within said first tube assembly;

(c) said first tube assembly and said second tube assembly being mounted with respect to a vehicle such that said first tube assembly and said second tube assembly are slidably movable with respect to each other;

(d) a shock pad movably positioned on at least one of said first tube assembly said second tube assembly and between said first stop flange and said second stop flange; and (e) an adjustment mechanism for adjusting the relative positioning of said shock pad between said first and second stop flanges, said adjustment mechanism including an adjustment screw that is threaded into one of said first or second tube assemblies, wherein said adjustment screw is positioned between a rod end and one of said first or second tube assemblies, the adjustment screw being independent of the rod end.

8. The system of claim 7, wherein said adjustment mechanism further includes a jam nut for use in adjusting the threading of said adjustment screw within one of said first and second tube assemblies.

9. The system of claim 7, wherein said rod end is pivotally mounted to a bracket, said bracket being mounted to a vehicle.

10. The system of claim 7, wherein a nut is mounted on said one of said first and second tube assemblies adjacent said first or second stop flanges.

11. The system of claim 7, wherein adjustment of said adjustment mechanism causes a gap between said first and second stop flanges to be varied.

12. The system of claim 11, wherein said gap is adjusted such that said shock pad is brought into contact with both said first and second stop flanges.

13. The system of claim 11, wherein said gap is adjusted such that said shock pad is spaced between said first and second stop flanges by a distance of about one half inch.

14. A system for enhancing traction of a vehicle, comprising:

(a) a first tube assembly defining a first stop flange;

(b) a second tube assembly defining a second stop flange, said second tube assembly being disposed in part within said first tube assembly;

(c) said first tube assembly and said second tube assembly being mounted with respect to a vehicle such that said first tube assembly and said second tube assembly are slidably movable with respect to each other;

(d) a shock pad movably positioned on at least one of said first tube assembly and said second tube assembly and between said first stop flange and said second stop flange; and (e) a first bracket that includes: (i) a first plate, (ii) a pair of faces extending downwardly from said first plate and to which one of said first and second tube assemblies is pivotally mounted, and (iii) a pair of triangular side walls extending upwardly from said first plate and between which is positioned a bushing for mounting said first bracket to a vehicle;

(f) wherein said upwardly extending triangular side walls define a height and said first face defines a length, and a ratio of said height to length is between 0.85:1 and 1:0.85.

15. The system of claim 14, wherein said ratio is 1:1.

* * * * *